(12) United States Patent
Yasumoto

(10) Patent No.: US 8,587,538 B2
(45) Date of Patent: Nov. 19, 2013

(54) METHOD FOR DRIVING TOUCH PANEL AND APPARATUS FOR THE SAME

(75) Inventor: Takashi Yasumoto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 628 days.

(21) Appl. No.: 12/842,704

(22) Filed: Jul. 23, 2010

(65) Prior Publication Data

US 2011/0102337 A1 May 5, 2011

(30) Foreign Application Priority Data

Nov. 5, 2009 (JP) ................................ 2009-254482

(51) Int. Cl.
*G06F 3/041* (2006.01)

(52) U.S. Cl.
USPC ........... 345/173; 345/174; 345/175; 345/178; 178/18.01; 178/18.03; 178/18.06; 178/18; 178/19; 178/20

(58) Field of Classification Search
USPC .......................... 345/173, 174–178; 178/18.05
See application file for complete search history.

(56) References Cited

U.S. PATENT DOCUMENTS

2011/0102337 A1* 5/2011 Yasumoto ..................... 345/173

FOREIGN PATENT DOCUMENTS

JP         09-152932         6/1997

* cited by examiner

*Primary Examiner* — Alexander S Beck
*Assistant Examiner* — Amen Bogale
(74) *Attorney, Agent, or Firm* — Brinks Gilson & Lione

(57) ABSTRACT

An X-side resistive film and a Y-side resistive film of a touch panel face each other with a predetermined gap therebetween. Resistance values of the X-side and Y-side resistive films are measured with connections to the X-side and Y-side resistive films being alternately switched. X and Y coordinates of a contact position of the X-side resistive film and the Y-side resistive film are detected based on the measured resistance values. Amounts of current applied to the X-side and Y-side resistive films during on-periods of the X-side and Y-side connections are set to be different from each another in accordance with resistance values corresponding to the X-side and Y-side resistive films, respectively.

20 Claims, 13 Drawing Sheets

FIG. 3
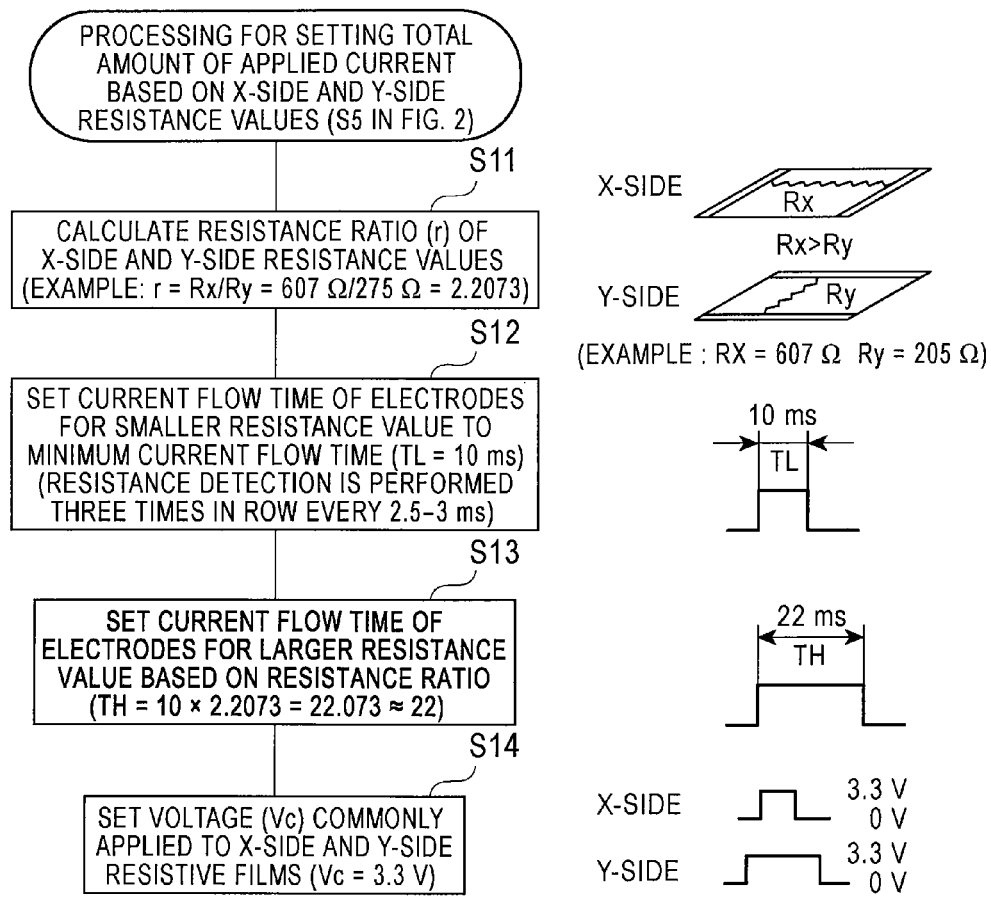
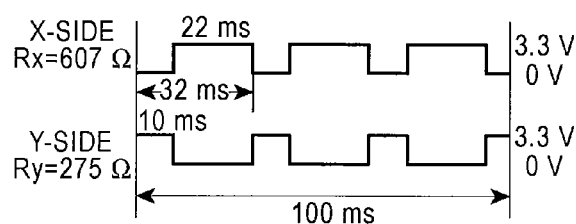
COMMONLY APPLIED VOLTAGE : 3.3V
EXAMPLE OF ESTIMATION OF TOTAL AMOUNT OF CURRENT
$Ix = \frac{V}{Rx} = 0.0054366$ (A/V: mA/ms)
$(Ix) \times 22 \text{ ms} \times (100/32)$
$= 0.3738 \text{ (mA/100 ms)}$
$Iy = \frac{V}{Ry} = 0.012000$ (A/V: mA/ms)
$(Iy) \times 10 \text{ ms} \times (100/32)$
$= 0.3750 \text{ mA/100 ms}$
SUM OF AMOUNTS OF CURRENT = Ix+Iy = 0.7488 (mA/100 ms)
85.9% OF RESULT ACCORDING TO RELATED ART ILLUSTRATED IN FIG. 10

FIG. 4
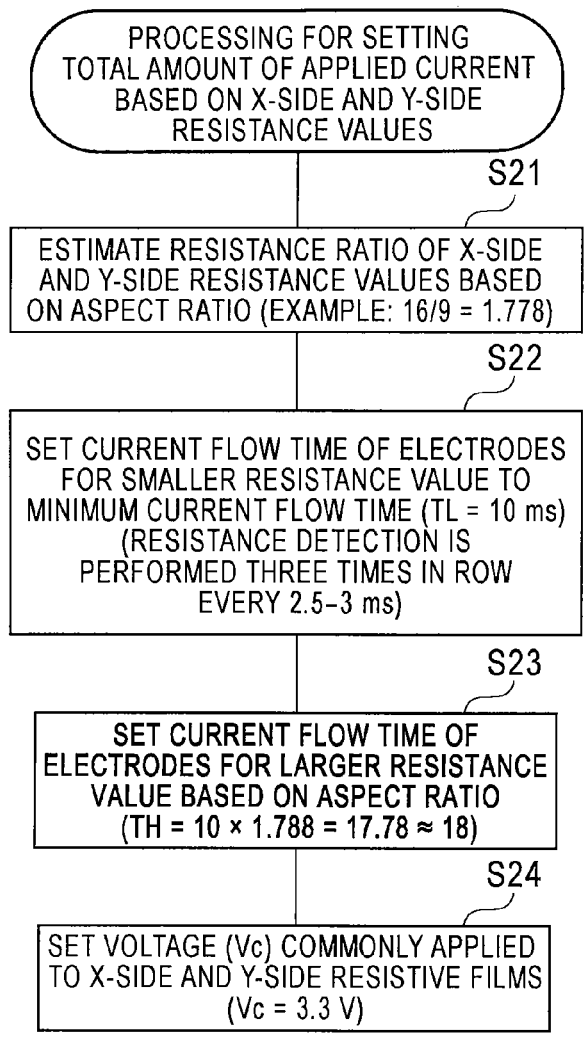
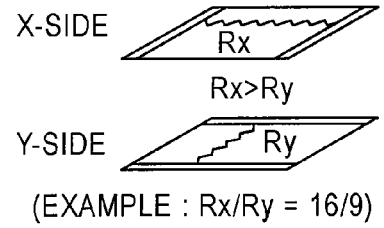
(EXAMPLE : Rx/Ry = 16/9)
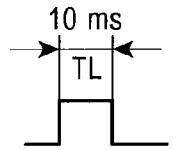
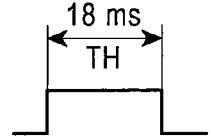
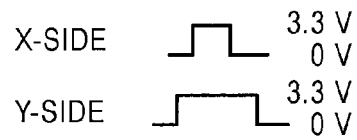
COMMONLY APPLIED VOLTAGE : 3.3 V
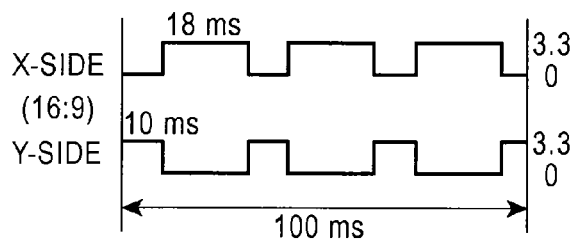
EXAMPLE OF ESTIMATION OF TOTAL AMOUNT OF CURRENT
$Ix = \dfrac{V}{607} = 0.0054366$ (A/V: mA/ms)
$(Ix) \times 18ms \times (100/28) = 0.3495 (mA/100\ ms)$
$Iy = \dfrac{V}{275} = 0.012000$ (A/V: mA/ms)
$(Iy) \times 10ms \times (100/28) = 0.4286\ mA/100\ ms$
SUM OF AMOUNTS OF CURRENT = $Ix + Iy = 0.7781 (mA/100ms)$
89.3% OF RESULT ACCORDING TO RELATED ART ILLUSTRATED IN FIG. 10

FIG. 5

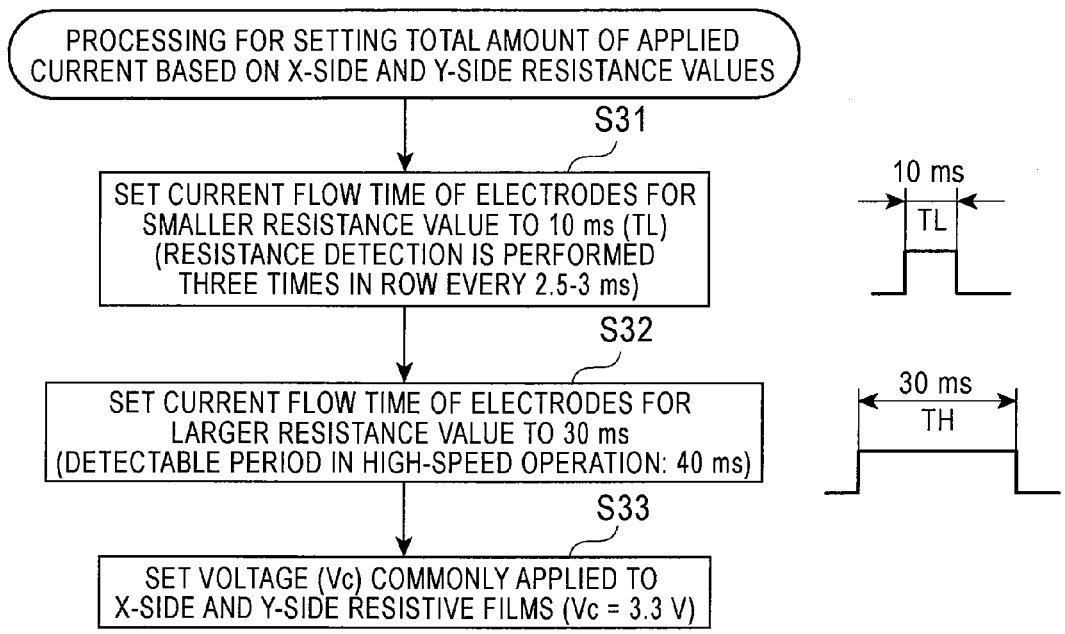

CONDITIONS
1. SET CURRENT FLOW TIME OF ELECTRODES FOR LARGER RESISTANCE VALUE AS LONG AS POSSIBLE
2. ALTHOUGH SHORTER CURRENT FLOW TIME IS PREFERABLE FOR ELECTRODES FOR SMALLER RESISTANCE VALUE, COORDINATE DATA IS ACQUIRED THREE TIMES AT INTERVALS OF 2.5-3 ms TO YIELD TWO PIECES OF MATCHING DATA (THUS, CURRENT FLOW TIME = APPROX. 10 ms)
3. SET SUM OF X-SIDE AND Y-SIDE OPERATION PERIODS SO THAT HIGH-SPEED OPERATION OF TOUCH PANEL CAN BE HANDLED (40 ms)

COMMONLY APPLIED VOLTAGE : 3.3V

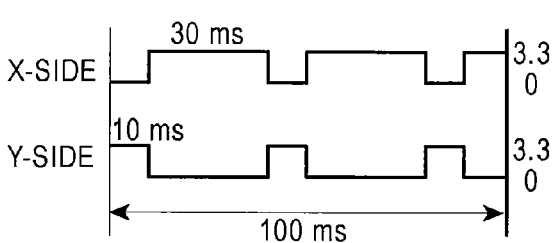

EXAMPLE OF ESTIMATION OF TOTAL AMOUNT OF CURRENT $Ix = \dfrac{V}{607} = 0.0054366$ (A/V: mA/ms)
$(Ix) \times 30 \text{ ms} \times (100/40)$
$= 0.4077 \text{(mA/100 ms)}$ $Iy = \dfrac{V}{275} = 0.012000$ (A/V: mA/ms)
$(Iy) \times 10 \text{ ms} \times (100/40)$
$= 0.3000 \text{ mA/100 ms}$ SUM OF AMOUNTS OF CURRENT = Ix + Iy = 0.7077(mA/100 ms)
81.2% OF RESULT ACCORDING TO RELATED ART ILLUSTRATED IN FIG. 10

FIG. 6

PROCESSING FOR SETTING TOTAL AMOUNT OF APPLIED CURRENT BASED ON X-SIDE AND Y-SIDE RESISTANCE VALUES

CONDITIONS

1. SET CURRENT FLOW TIME OF ELECTRODES FOR SMALLER RESISTANCE VALUE AS SHORT AS POSSIBLE (10 ms)
2. SET SUM OF X-SIDE AND Y-SIDE OPERATION PERIODS SO THAT HIGH-SPEED OPERATION OF TOUCH PANEL CAN BE HANDLED (40 ms)
3. SET CURRENT FLOW TIME OF ELECTRODES FOR LARGER RESISTANCE VALUE AS LONG AS POSSIBLE (30 ms)
4. SET VOLTAGE COMMONLY APPLIED TO X-SIDE AND Y-SIDE CLOSE TO MINIMUM OPERABLE VALUE (2.58 V)

COMMONLY APPLIED VOLTAGE : 2.58 V

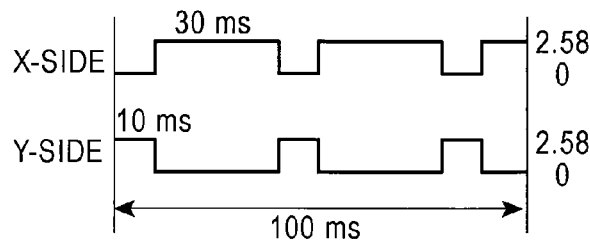

EXAMPLE OF ESTIMATION OF TOTAL AMOUNT OF CURRENT $Ix = \frac{V}{607} = 0.0042504$ (A/V: mA/ms)

$(Ix) \times 30\ ms \times (100/40) = 0.31878(mA/100\ ms)$ $Iy = \frac{V}{275} = 0.0093818$ (A/V: mA/ms)

$(Iy) \times 10\ ms \times (100/40) = 0.2345\ mA/100\ ms$

SUM OF AMOUNTS OF CURRENT = Ix + Iy = 0.5533(mA/100 ms)
63.35% OF RESULT ACCORDING TO
RELATED ART ILLUSTRATED IN FIG. 10

FIG. 7
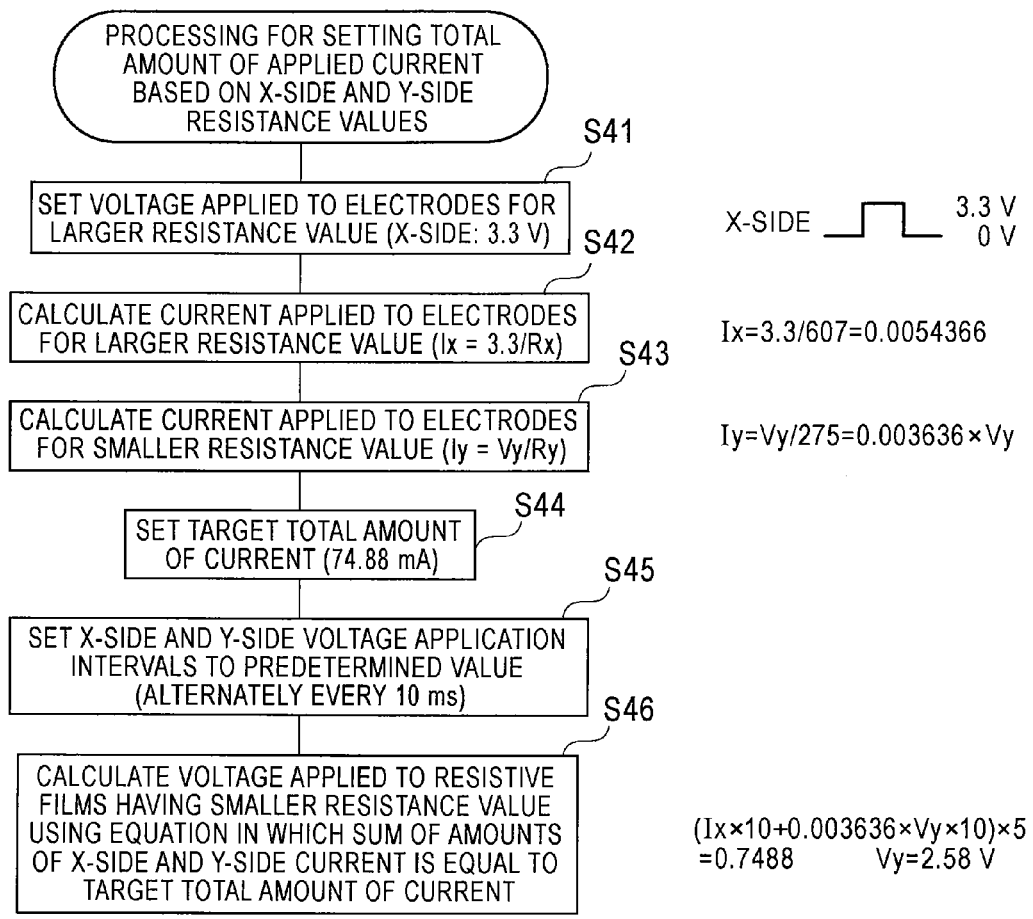
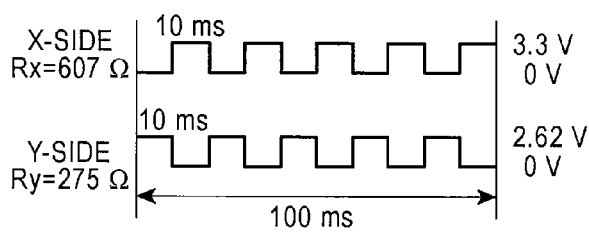
EXAMPLE OF ESTIMATION OF
TOTAL AMOUNT OF CURRENT
$Ix = \frac{V}{Rx} = 0.0054366$
(A/V: mA/ms)
$(Ix) \times 10 \text{ ms} \times (100/20)$
$= 0.2718 \text{ (mA/100 ms)}$
$Iy = \frac{V}{Ry} = \frac{2.58}{275} = 0.009382$
$(Iy) \times 10 \text{ ms} \times (100/20)$
$= 0.477 \text{ mA/100 ms}$
SUM OF AMOUNTS OF CURRENT=Ix+Iy=0.7488 (mA/100 ms)
84.99% OF RESULT ACCORDING TO
RELATED ART ILLUSTRATED IN FIG. 10

FIG. 8

PROCESSING FOR SETTING TOTAL AMOUNT OF APPLIED
CURRENT BASED ON X-SIDE AND Y-SIDE RESISTANCE VALUES

CONDITIONS

1. SET VOLTAGE COMMONLY APPLIED TO X-SIDE AND Y-SIDE
   TO MINIMUM OPERABLE VOLTAGE Vx = Vy = 2.58 V

2. ALTHOUGH SHORTER CURRENT FLOW TIME IS PREFERABLE
   FOR RESISTIVE FILM HAVING SMALLER RESISTANCE VALUE,
   COORDINATE DATA IS ACQUIRED EVERY 2.5-3 ms THREE TIMES
   (THUS, CURRENT FLOW TIME OF X-SIDE AND Y-SIDE = 10 ms)

COMMONLY
APPLIED VOLTAGE : 2.58 V

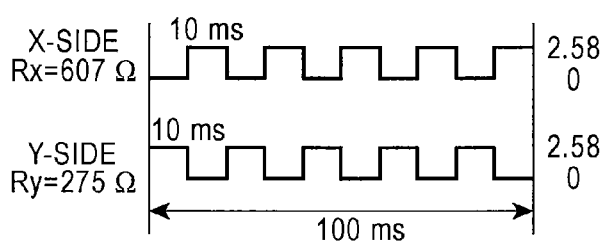

EXAMPLE OF ESTIMATION OF
TOTAL AMOUNT OF CURRENT $Ix = \frac{2.58}{607} = 0.0042504$ $(Ix) \times 10 \text{ ms} \times (100/20)$
$= 0.2125 \text{ (mA/100ms)}$ $Iy = \frac{2.58}{275} = 0.0093818$ $(Iy) \times 10 \text{ ms} \times (100/20)$
$= 0.4691 \text{ mA/100 ms}$ SUM OF AMOUNTS OF CURRENT = Ix+Iy = 0.6816 (mA/100 ms)

78.08% OF RESULT ACCORDING TO
RELATED ART ILLUSTRATED IN FIG. 10

FIG. 15A (prior art)

|  | X-SIDE RESISTANCE VALUE | Y-SIDE RESISTANCE VALUE |
|---|---|---|
| MINIMUM | 387 Ω | 275 Ω |
| MAXIMUM | 607 Ω | 413 Ω |
| AVERAGE | 470 Ω | 331 Ω |

FIG. 15B (prior art)

|  | X-SIDE RESISTANCE VALUE | Y-SIDE RESISTANCE VALUE |
|---|---|---|
| MINIMUM | 544 Ω | 851 Ω |
| MAXIMUM | 648 Ω | 675 Ω |
| AVERAGE | 593 Ω | 362 Ω |

_US 8,587,538 B2_

METHOD FOR DRIVING TOUCH PANEL AND APPARATUS FOR THE SAME

PRIORITY CLAIM

This application claims the benefit of Japanese Patent Application No. 2009-254482, filed on Nov. 5, 2009, and which is incorporated by reference herein in its entirety.

BACKGROUND

1. Field of the Invention

The present invention relates to touch panels adhered on surfaces of display devices, such as liquid crystal displays (LCDs). More particularly, the present invention relates to a method for driving a touch panel with small electric power and an apparatus for executing the method.

2. Description of the Related Art

For example, an input operation is performed in a following manner with transparent touch panels adhered on various display screens. The screens display, for example, various images associated with instructions to be input. Users touch one of the images with their finger. A detecting unit of the touch panels according to various technologies then detects the touched position of the screens in an X-Y plane. The detecting unit identifies an instruction input by the users by determining the instruction associated with the image displayed at the detected position. At this time, the users can specify not only a point but also a line and an area by continuously tracing the points and can display the line and the area.

Although various technologies exist for such touch panels, resistive touch panels are widely used because they can offer excellent position detection accuracy, stable operations, few troubles, and a relatively low manufacture cost. Various methods exist for the resistive touch panels. Many of the methods have a cross section illustrated in FIG. 12A. More specifically, sealing members 2 for sticking upper and lower panels together and dot spacers 3 for preventing short-circuit of upper and lower electrodes are arranged on a surface of a base glass substrate 1. A resilient sheet 4 made of glass or polyethylene terephthalate (PET) is adhered on surfaces of the sealing members 2. In this way, a touch panel 5 is formed. The sealing members 2 have a thickness of approximately 5-10 μm, whereas the sheet 4 has a thickness of approximately 200 μm. A transparent fixed-side resistive film 6 of indium tin oxide (ITO) is disposed on a surface of the glass substrate 1 that faces the sheet 4. A transparent movable-side resistive film 7 of ITO is disposed on a surface of the sheet 4 that faces the glass substrate 1. The resistive films 6 and 7 have electrodes on opposing sides thereof to receive voltage applied thereto.

A four-wire configuration is a basic electrode configuration. FIG. 12B illustrates a method for detecting a position of a point touched with a finger in the four-wire configuration. In an example illustrated in FIG. 12B, to detect a touched position in a Y-axis direction of a X-Y plane, fixed-side electrodes Y1 and Y2 are disposed on opposing horizontal sides of a fixed-side resistive film. Voltage is applied to the electrodes Y1 and Y2 so that the electrodes Y1 and Y2 function as positive and negative electrodes, respectively. To detect the touched position in an X-axis direction, movable-side electrodes X1 and X2 are disposed on opposing vertical sides of a movable-side resistive film. Voltage is applied to the electrodes X1 and X2 so that the electrodes X1 and X2 function as positive and negative electrodes, respectively. The fixed-side electrodes and the movable-side electrodes face each other through spacers (not illustrated).

If a user touches a given point P of a touch panel having such an electrode configuration, the movable-side resistive film bends in the direction of the spacers to come into contact with the fixed-side resistive film. In response to the contact, resistances for dividing the applied voltage are produced in the movable-side and fixed-side resistive films. Resistance values of these resistances can be determined. More specifically, in the illustrated example, resistances Rx1 and Rx2 are produced between the electrode X1 and the point P and between the electrode X2 and the point P, respectively. Similarly, resistances Ry1 and Ry2 are produced between the electrode Y1 and the point P and between the electrode Y2 and the point P, respectively.

As illustrated in FIG. 13, the positions of the point P in the X-axis and Y-axis directions can be detected by measuring, with a voltmeter V, with connections being switched by a resistance-measuring switch SW, voltage values affected by the resistances Rx1 and Rx2 and the resistances Ry1 and Ry2 produced in response to the contact of the X-side and Y-side resistive films at the point P, respectively. In the illustrated example, the positions of the point P in the X-axis and Y-axis directions are detected as Ex and Ey, respectively, by operating the switch SW.

As described above, a touch panel includes touch detecting surfaces functioning as resistive surfaces for detecting resistances, electrodes, a power system for the electrodes, and lead circuits to an exit portion connected to a flexible printed circuit board (FPC) having circuits for signals for use in measurement of the resistance values. FIG. 14 illustrates a glass substrate 1 having fixed-side electrodes 7 an 8 of a touch panel. For example, the electrodes 7 and 8 disposed on respective sides of a fixed-side resistive film 6 are connected to a lead-circuit exit portion 11 through lead circuits. Similarly, electrodes of a movable-side resistive film (not illustrated) are connected to the lead-circuit exit portion 11 through lead circuits 9 and 10. The arrangement of the lead circuits of the resistive films often differs for each product.

In the method illustrated in FIG. 13, the point touched by a user on the touch panel is detected with connections being switched by the switch SW. In practice, the switching operation is performed in a manner illustrated in FIG. 10, for example. More specifically, in an example illustrated in FIG. 10, an electronic circuit alternately applies voltage to the opposing electrodes of the movable-side resistive film (hereinafter, referred to as X-side electrodes) and the opposing electrodes of the fixed-side resistive film (hereinafter, referred to as Y-side electrodes) every 10 milliseconds (ms) to demonstrate the switching function. Here, the switching interval is set to 10 ms because of the following reason. Many currently used touch panels measure resistance values using a fine pulse of 2.5-3 ms as illustrated in FIG. 11D, for example. Upon successively acquiring the same data twice, the touch panels output the data as the measured resistance value.

As illustrated in FIG. 11A, the first 3 ms of a touch operation, which can also be referred to as a switching operation caused by the contact of the resistive films in response to the user touch operation on the touch panel, is in a chattering state where the contact is unstable just like various other switching operations. An accurate resistance value is not available with the pulse for detection of the resistance value generated during this period. When pulses generated every 3 ms are used to detect coordinates of the touched position, it takes 6 ms or more to successively acquire the same result from measurement of the resistance value with the following two pulses. When the measurement is performed every 2.5 ms, it takes 5 ms or more. Here, as illustrated in FIGS. 11A-11D, it is assumed that the switching operation is performed every 10 ms and a touch operation is performed during a period when measurement on the X side is enabled. In such a case, measurement executed during the first 2.5-3 ms yields an inaccurate value but measurement can be executed twice or more during the remaining period, i.e., approximately 7 ms.

In consideration of such respects, many touch panels switch power distribution every 10 ms so that voltage is alternately supplied to the X-side electrodes and the Y-side electrodes. The switching operation performed every 10 ms is effective to detect a touch operation as rapidly as possible. However, when the touch panel receives a manual input operation, such as one performed with a finger, the input speed has a limit. Even an expert of fast pushing of buttons of a game platform can perform the input operation 16 times per second. When the input operation is performed 25 times per second, an interval of 40 ms is long enough to detect the input operation. However, in many cases, the interval is set to 10 ms in consideration of various usage states of the touch panels described above.

A discussion will now be given for a total amount of current consumed by a touch panel illustrated in FIGS. 11A-11D according to the related art when the power distribution to the X side and the Y side is switched every 10 ms. FIGS. 15A and 15B illustrate results obtained by actually measuring resistance values of currently used touch panels. More specifically, FIG. 15A illustrates a result obtained from measurement on 130 touch panels of the same type for a 4.3-inch widescreen monitor having an aspect ratio of 16:9. The result indicates that minimum, maximum, and average resistance values on the X side (horizontal direction) of the touch panels were 387 Ω, 607Ω, and 470Ω, respectively. In contrast, minimum, maximum, and average resistance values on the Y side were 275 Ω, 413Ω, and 331Ω, respectively. FIG. 15B illustrates a result obtained from measurement on 42 touch panels of the same type for an 8.4-inch widescreen monitor having an aspect ratio of 4:3. In the touch panels of this type, minimum, maximum, and average resistance values on the X side were 544Ω, 648Ω, and 593Ω, respectively. In contrast, minimum, maximum, and average resistance values on the Y side were 351Ω, 375Ω, and 362Ω, respectively.

Even the touch panels of the same type have the varying resistance values because of variation of surface resistivity of ITO resistive films, variation of thickness of the ITO resistive films, variation of silver electrodes disposed on the respective sides of the resistive films, and variation of length of a silver-electrode circuit, including the electrodes and lead circuits illustrated in FIG. 14, used in measurement of the resistance values.

The resistance-value variation is discussed about, for example, the 4.3-inch touch panels having the aspect ratio of 16:9 illustrated in FIG. 15A. A touch panel may exist that have the X-side and Y-side resistance values of 607Ω and 275Ω, respectively, when a difference between the X-side and Y-side resistance values is the largest. An amount of current consumed by the touch panel having such resistance values in a standby state is discussed. As illustrated in FIG. 10, when a voltage of 3.3 V is commonly applied to the X-side and Y-side electrodes in the related art, a current Ix of the X-side resistive film is determined based on the commonly applied voltage Vc and the resistance value of 607Ω of the X-side resistive film selected in the above-described manner. More specifically, the current Ix is determined as follows: Ix=(commonly applied voltage Vc)/(X-side resistance value Rx)=3.3 V/607 Ω=0.0054366 A. That is, a current of 0.0054366 A (=5.436 mA) flows through the X-side resistive film per second. Accordingly, a current of 0.0054366 mA flows per millisecond.

Similarly, an amount of current consumed by the Y-side resistive film is determined. Since the voltage commonly applied to the X-side and the Y-side resistive films is equal to 3.3 V and the resistance value selected in the above-described manner is equal to 275Ω, a current Iy of the Y-side resistive film is determined as follows: Iy=Vc/Ry=3.3 V/275Ω=0.01200 A. Accordingly, a current of 0.01200 mA flows per millisecond. Since voltage is alternately applied to the X-side and Y-side resistive films of this touch panel every 10 ms, an amount current consumed during 100 ms is determined to cope with an actual usage state of the touch panel. A 10-ms pulse is supplied to the X-side resistive film five (=100 ms/(10+10) ms) times. Accordingly, as illustrated in FIG. 10, an amount of current consumed by the X-side resistive film during 100 ms is calculated as follows: (Ix)×10 ms×(100/20) times=0.2718 mA/100 ms. Similarly, an amount of current consumed by the Y-side resistive film during 100 ms is equal to 0.6000 mA/100 ms. Accordingly, a sum of the amounts of current consumed by the x-side and Y-side resistive films during 100 ms is equal to 0.8718 mA/100 ms.

Japanese Unexamined Patent Application Publication No. 9-152932 discloses a technology for decreasing power consumption of a touch panel by extending intervals at which driving current is intermittently applied to the touch panel if it is determined that an input operation on the touch panel is not continued.

SUMMARY

As described above, touch panels currently widely used in various devices are supplied with electric power even when they are not receiving a touch operation (i.e., in a standby state) and, thus, consume the electric power even in the standby state. It is desired to decrease power consumption of touch panels as much as possible in small devices, such as mobile phones and mobile information terminals, having a relatively small battery capacity owing to miniaturization. The desire for decreasing the power consumption of the touch panels is not limited to the mobile devices. For example, a decrease in power consumption of vehicle-mounted devices, such as vehicle navigation systems, is desired to reduce battery power consumed by vehicles. Accordingly, it is also desired to decrease power consumption of touch panels adhered on monitors of the vehicle-mounted devices as much as possible.

In accordance with aspects of the present invention, provided are a method for driving a touch panel while saving electric power by decreasing driving current applied to the touch panel as much as possible and an apparatus for executing the method.

In accordance with an aspect of the present invention, provided is a method for driving a touch panel. The touch panel includes an X-side resistive film and a Y-side resistive film facing each other with a predetermined gap therebetween. The touch panel measures a resistance value of the X-side resistive film and a resistance value of the Y-side resistive film while alternately switching between a connection to the X-side resistive film and a connection to the Y-side resistive film using a switch to detect X and Y coordinates of a contact position of the X-side resistive film and the Y-side resistive film based on the measured resistance values. The method for driving such a touch panel includes the step of setting an amount of current applied to the X-side resistive film during an on-period of the connection to the X-side resistive film and an amount of current applied to the Y-side resistive film during an on-period of the connection to the Y-side resistive film based on a value related to a resistance value of resistance including the X-side resistive film and a resistance value of resistance including the Y-side resistive film so that the amount of the X-side applied current differs from the amount of the Y-side applied current.

In the foregoing method for driving a touch panel, the resistance value of the resistance preferably includes the resistance value of the resistive film and a resistance value of a lead circuit connected to the resistive film.

In the foregoing method for driving a touch panel, the value related to the resistance values is preferably based on accumulated data of resistance values resulting from measurement on a plurality of touch panels.

In the foregoing method for driving a touch panel, the value related to the resistance values is preferably an aspect ratio of the touch panel.

In the foregoing method for driving a touch panel, the amount of the X-side applied current and the amount of the Y-side applied current are set to be different from one another preferably by setting different values for X-side current flow time and Y-side current flow time. The current flow time of one side having the resistance value smaller than the other side is preferably set shorter than the current flow time of the other side having the larger resistance value.

In the foregoing method for driving a touch panel, the current flow time of the side having the smaller resistance value is preferably set to a minimum value that allows the detection of the coordinates of the contact position to be successfully performed.

In the foregoing method for driving a touch panel, the current flow time of the other side having the larger resistance value is preferably set to a maximum value that does not disturb the detection of the coordinates of the contact position.

In the foregoing method for driving a touch panel, the amount of the X-side applied current and the amount of the Y-side applied current are set to be different from one another preferably by setting different values for voltage applied to the X-side resistive film and voltage applied to the Y-side resistive film. The voltage applied to one side having the resistance value smaller than the other side is preferably set lower than the voltage applied to the other side having the larger resistance value.

In the foregoing method for driving a touch panel, the applied voltage is preferably set to target voltage close to a minimum value that allows the detection of the coordinates of the contact position to be successfully performed. Actually applied voltage is preferably controlled so that a detected voltage value becomes substantially equal to the set target voltage.

In the foregoing method for driving a touch panel, the amount of the X-side applied current and the amount of the Y-side applied current are set to be different from one another preferably by setting different values for X-side current flow time and Y-side current flow time and setting different values for voltage applied to the X-side resistive film and voltage applied to the Y-side resistive film.

In the foregoing method for driving a touch panel, the amount of the X-side applied current and the amount of the Y-side applied current are set to be different from one another preferably by setting the current flow time of one side having the resistance value smaller than the other side shorter than the current flow time of the other side having the larger resistance value. The current flow time of the side having the smaller resistance value is preferably set to a minimum value that allows the detection of the coordinates of the contact position to be successfully performed. The current flow time of the other side having the larger resistance value is preferably set to a maximum value that does not disturb the detection of the coordinates of the contact position.

In accordance with another aspect of the present invention, provided is an apparatus for driving a touch panel. The touch panel includes an X-side resistive film and a Y-side resistive film facing each other with a predetermined gap therebetween, and a detecting unit configured to detect a contact position of the X-side resistive film and the Y-side resistive film while alternately supplying electric power to the X-side resistive film and to the Y-side resistive film to determine X and Y coordinates of the contact position based on the detected value. The apparatus for driving such a touch panel includes a setting unit configured to set an amount of current applied to the X-side resistive film when the electric power is supplied to the X-side resistive film and an amount of current applied to the Y-side resistive film when the electric power is supplied to the Y-side resistive film based on a value related to a resistance value of resistance including the X-side resistive film and a resistance value of resistance including the Y-side resistive film so that the amount of the X-side applied current differs from the amount of the Y-side applied current.

In the foregoing apparatus for driving a touch panel, the resistance value of the resistance preferably includes a resistance value of the resistive film and a resistance value of a lead circuit connected to the resistive film.

In the foregoing apparatus for driving a touch panel, the value related to the resistance values is preferably based on accumulated data of resistance values resulting from measurement on a plurality of touch panels.

In the foregoing apparatus for driving a touch panel, the value related to the resistance values is preferably an aspect ratio of the touch panel.

In the foregoing apparatus for driving a touch panel, the setting unit sets the amount of the X-side applied current and the amount of the Y-side applied current to be different from one another preferably by setting different values for X-side current flow time and Y-side current flow time. The current flow time of one side having the resistance value smaller than the other side is preferably set shorter than the current flow time of the other side having the larger resistance value.

In the foregoing apparatus for driving a touch panel, the current flow time of the side having the smaller resistance value is preferably set to a minimum value that allows the detection of the coordinates of the contact position to be successfully performed.

In the foregoing apparatus for driving a touch panel, the current flow time of the other side having the larger resistance value is preferably set to a maximum value that does not disturb the detection of the coordinates of the contact position.

In the foregoing apparatus for driving a touch panel, the setting unit sets the amount of the X-side applied current and the amount of the Y-side applied current to be different from one another preferably by setting different values for voltage applied to the X-side resistive film and voltage applied to the Y-side resistive film. The voltage applied to one side having the resistance value smaller than the other side is preferably set lower than the voltage applied to the other side having the larger resistance value.

In the foregoing apparatus for driving a touch panel, the applied voltage is preferably set to target voltage close to a minimum value that allows the detection of the coordinates of the contact position to be successfully performed. Actually applied voltage is preferably controlled so that a detected voltage value becomes substantially equal to the set target voltage.

In the foregoing apparatus for driving a touch panel, the setting unit preferably sets different values for X-side current flow time and Y-side current flow time and preferably sets different values for voltage applied to the X-side resistive film and voltage applied to the Y-side resistive film to make the amount of the X-side applied current and the amount of the Y-side applied current different.

In the foregoing apparatus for driving a touch panel, the setting unit preferably sets the current flow time of one side having the resistance value smaller than the other side shorter than the current flow time of the other side having the larger resistance value, preferably sets the current flow time of the side having the smaller resistance value to a minimum value that allows the detection of the coordinates of the contact position to be successfully performed, and preferably sets the current flow time of the other side having the larger resistance value to a maximum value that does not disturb the detection of the coordinates of the contact position to make the amount of the X-side applied current and the amount of the Y-side applied current different.

With the above-described configurations, embodiments of the present invention can advantageously decrease an amount of driving current applied to a touch panel to save power consumption of the touch panel.

BRIEF DESCRIPTION OF THE DRAWINGS

FIG. 3 is a flowchart of an operation illustrated in FIG. 2;

FIG. 4 is a flowchart of an operation according to another embodiment of the present invention;

FIG. 5 is a flowchart according to another embodiment of the present invention;

FIG. 6 is a diagram illustrating details of an operation according to a further embodiment of the present invention and an example of estimation of a total amount of current;

FIG. 7 is a flowchart of an operation according to a further embodiment of the present invention;

FIG. 8 is a diagram illustrating details of an operation according to still another embodiment of the present invention and an example of estimation of a total amount of current;

FIGS. 15A and 15B are tables illustrating examples of data of measured resistance values of various touch panels.

DETAILED DESCRIPTION

Figure 1:
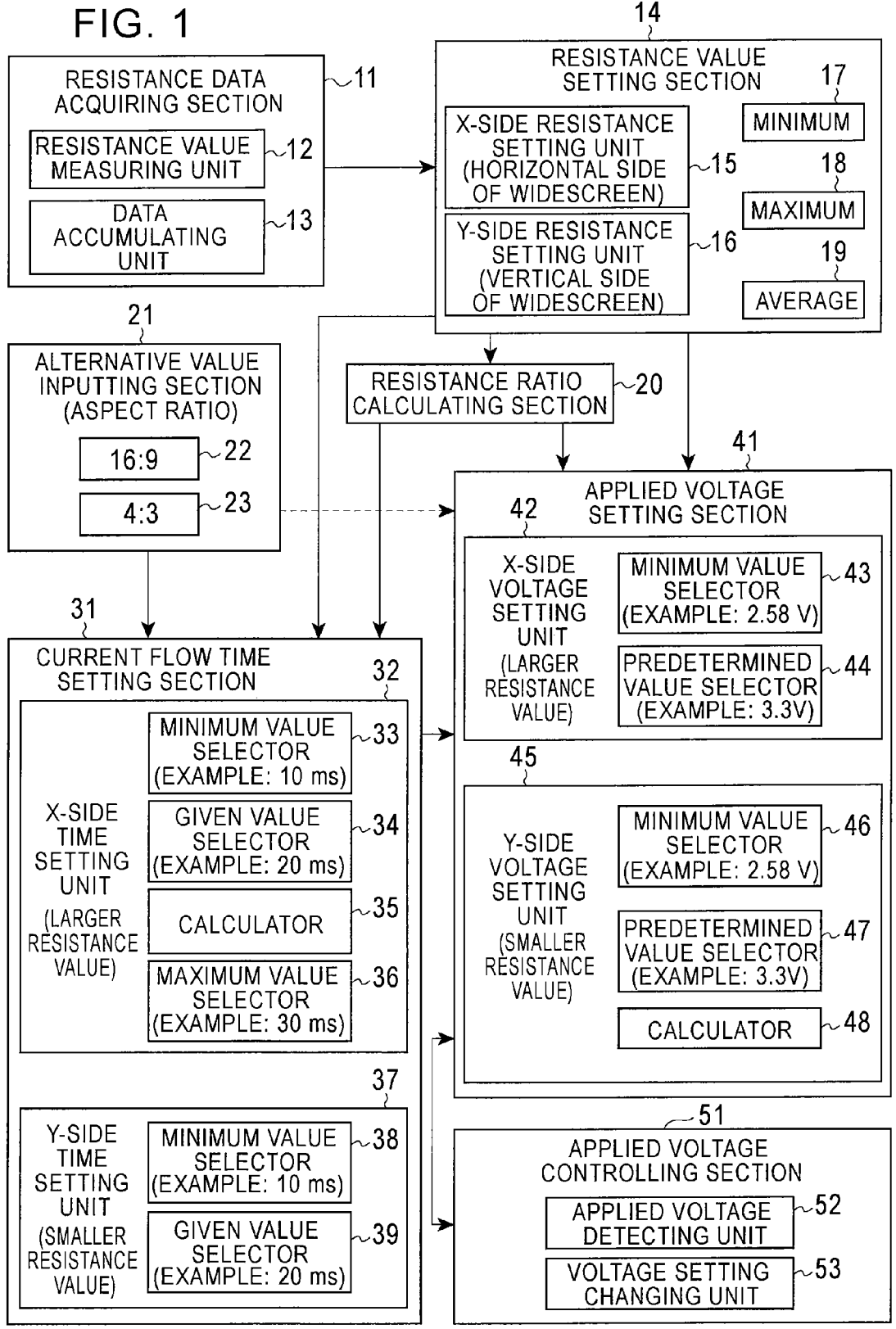
FIG. 1 is diagram illustrating functional blocks for carrying out various embodiments of the present invention.

Embodiments of the present invention will be described with reference to the drawings. FIG. 1 is a diagram illustrating functional blocks for carrying out various embodiments of the present invention. In the embodiments of the present invention, intended operations can be executed with some of the functional blocks. Additionally, a touch-panel control unit of touch-panel including devices, such as LCDs, uses many of the functional blocks to previously set voltage to be applied and current flow time during which electric power is alternately applied to X-side and Y-side resistive films of the touch panel. Some of the other functional blocks are used to acquire data of resistance values and to manage applied voltage during use of the touch panel. The functional blocks demonstrating the various functions can be referred to as means for demonstrating the various functions.

Figure 14:
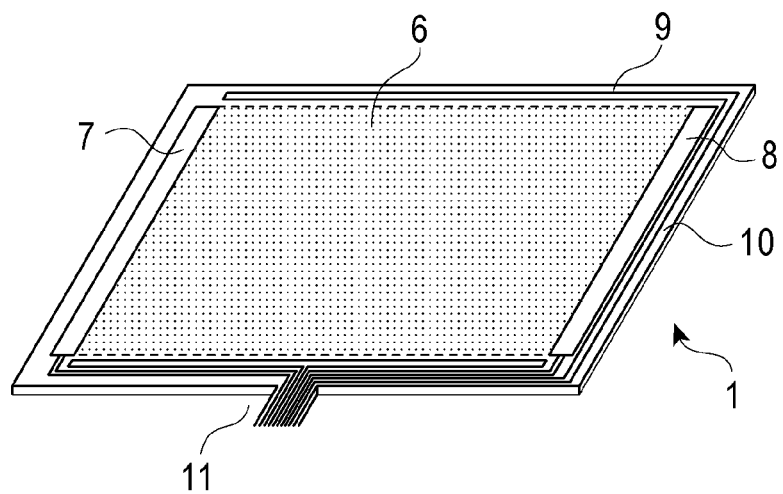
FIG. 14 is a diagram illustrating resistive films, electrodes, and lead circuits of a touch panel.

To set voltage to be applied and current flow time for controlling application of electric power of the touch panel, an example illustrated in FIG. 1 includes a touch-panel resistance-value data acquiring section (hereinafter, referred to as a resistance data acquiring section) 11. The resistance data acquiring section 11 acquires data of actual resistance values of touch panels, such as data illustrated in FIGS. 15A and 15B. More specifically, the resistance data acquiring section 11 measures resistance values of X-side and Y-side resistive films of many samples, i.e., touch panels of the same type. During the measurement, the resistance data acquiring section 11 can utilize lead wires of the lead-circuit exit portion 11 illustrated in FIG. 14.

The resistance data acquiring section 11 illustrated in FIG. 1 includes a resistance value measuring unit 12 and a data accumulating unit 13. An operator of the resistance value measuring unit 12 sequentially measures X-side and Y-side resistance values of a predetermined number of touch panels, e.g., 130 touch panels. The data accumulating unit 13 accumulates data of the measured resistance values. A resistance value setting section 14 sets resistance values for used in setting of current flow time and a calculation of applied voltage. The resistance value setting section 14 includes an X-side resistance value setting unit (hereinafter, referred to as an X-side resistance setting unit) 15 and a Y-side resistance value setting unit (hereinafter, referred to as a Y-side resistance setting unit) 16. The X-side resistance setting unit 15 sets a resistance value on the X side, i.e., the horizontal side of a widescreen. The Y-side resistance setting unit 16 sets a resistance value on the Y side, i.e., the vertical side of the widescreen.

Figure 10:
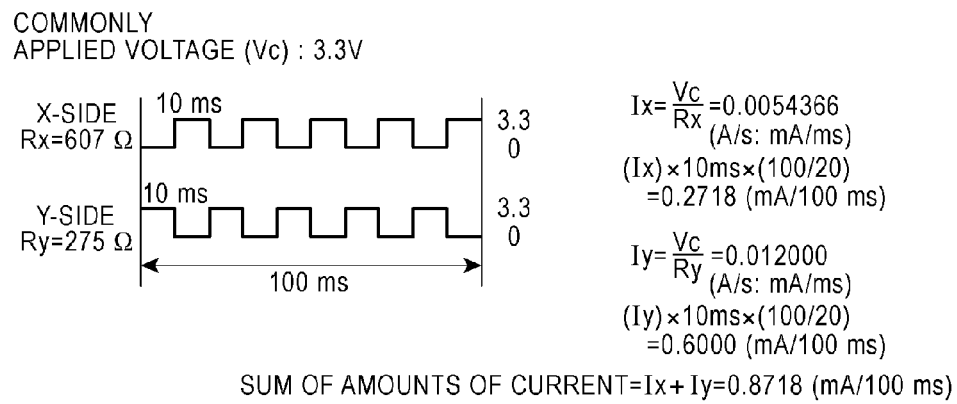
FIG. 10 is a diagram illustrating details of an operation and an example of estimation of a total amount of current in accordance with the related art.
Figure 11A:
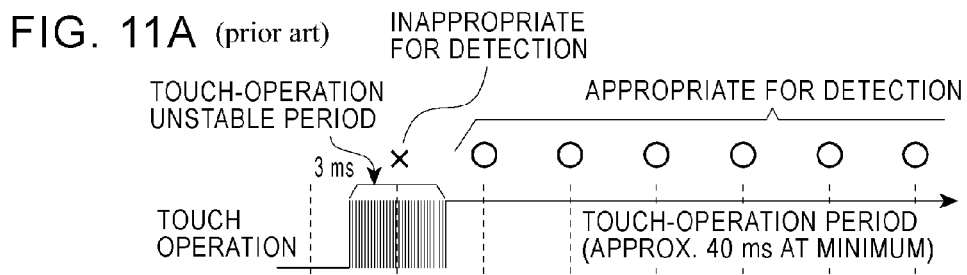
FIGS. 11A-11D are diagrams describing minimum current flow time.
Figure 11B:
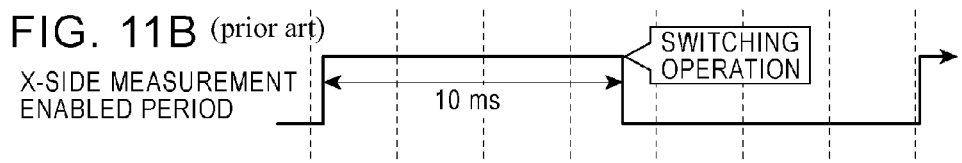
Figure 11C:
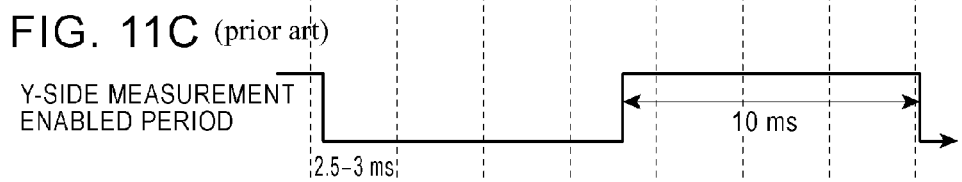
Figure 11D:
Figure 12A:
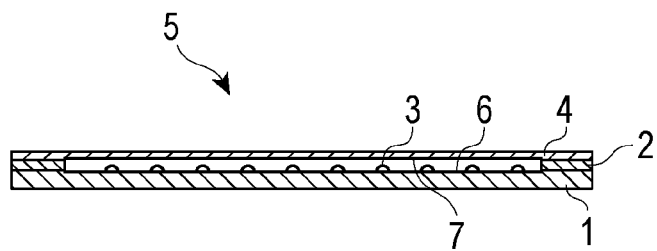
FIGS. 12A and 12B are diagrams illustrating touch panels.
Figure 12B:
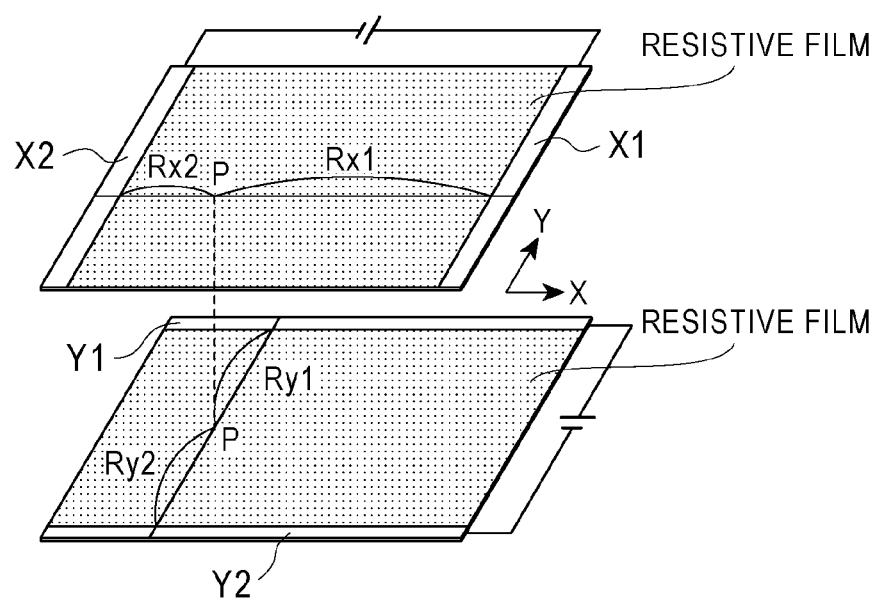
Figure 13:
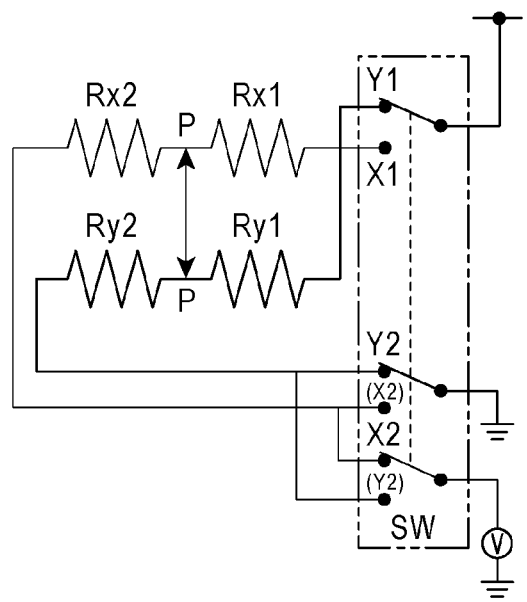
FIG. 13 is a diagram illustrating a method for measuring X and Y coordinates of a position of a touch panel.

The resistance values can be set using the data accumulated by the data accumulating unit 13 of the resistance data acquiring section 11. More specifically, one of a minimum value 17, a maximum value 18, and an average value 19, such as those illustrated in FIGS. 15A and 15B, can be selected and used as the resistance value. In a calculation of a total amount of current according to the related art illustrated in FIG. 10, maximum and minimum values, i.e., 607Ω and 275Ω, are selected for the X side having a resistance value larger than the Y side and the Y side having a resistance value smaller than the X side, respectively, to handle a state with the largest difference. Other than these values, a frequently appearing resistance value may be selected and set based on a distribution of the accumulated data.

The example illustrated in FIG. 1 also includes a resistance ratio calculating section 20. The resistance ratio calculating section 20 calculates a resistance ratio of the resistance values set by the X-side and Y-side resistance setting units 15 and 16 of the resistance value setting section 14. When the resistance values selected by the X-side and Y-side resistance setting units 15 and 16 are, for example, 607Ω and 275Ω, respectively, the resistance ratio calculating section 20 calculates a resistance ratio of the Y-side resistance value to the X-side resistance value, i.e., 607/275. The resulting resistance ratio can also be expressed as 2.2073. The calculated resistance ratio is used in setting of X-side and Y-side current flow time values and applied voltage values.

A resistance-ratio alternative-value inputting section (hereinafter, referred to as an alternative value inputting section) 21 allows a ratio of the width to the height of the touch panel, namely, an aspect ratio, to be used when use of brief data is permitted or the resistance ratio is substantially unavailable because of difficulty in acquisition of the data of the resistance values at the time of setting of current flow time based on the X-side and Y-side resistance values. Many of currently used LCDs have an aspect ratio 22 of 16:9 and an aspect ratio 23 of 4:3. Windscreen LCDs, such as monitors of some types of vehicle navigation systems, also exist that have an aspect ratio close to 2:1. Data of such aspect ratios can be input through the alternative value inputting section 21 and used instead of the resistance ratio.

A current flow time setting section 31 sets a period during which current is applied to the resistive film. The current flow time setting section 31 includes an X-side current flow time setting unit (hereinafter, referred to as an X-side time setting unit) 32 and a Y-side current flow time setting unit (hereinafter, referred to as a Y-side time setting unit) 37. The X-side time setting unit 32 sets current flow time of the X-side resistive film having the larger resistance value, whereas the Y-side time setting unit 37 sets current flow time of the Y-side resistive film having the smaller resistance value. In the example illustrated in FIG. 1, the X-side time setting unit 32 includes a minimum value selector 33 for selecting a minimum value, e.g., 10 ms, a given value selector 34 for selecting a give value, e.g., 20 ms, a calculator 35 for performing a calculation described below using the resistance ratio or the aspect ratio, and a maximum value selector 36 for selecting a maximum value, e.g., 30 ms. Additionally, in the illustrated example, the Y-side time setting unit 37 includes a minimum value selector 38 for selecting a minimum value, e.g., 10 ms, and a given value selector 39 for selecting a given value, e.g., 20 ms.

An applied voltage setting section 41 illustrated in FIG. 1 includes an X-side applied voltage setting unit (hereinafter, referred to as an X-side voltage setting unit) 42 and a Y-side applied voltage setting unit (hereinafter, referred to as a Y-side voltage setting unit) 45. The X-side voltage setting unit 42 sets voltage applied to the X-side resistive film having the larger resistance value, whereas the Y-side voltage setting unit 45 sets voltage applied to the Y-side resistive film having the smaller resistance value. The X-side voltage setting unit 42 includes a minimum value selector 43 for selecting a minimum voltage value (e.g., 2.58 V) that allows the touch panel to operate and a predetermined value selector 44 for selecting a predetermined voltage value, e.g., 3.3 V. As the minimum value, the minimum value selector 43 can select a product of a logical minimum value and a given rate including a margin.

In the illustrated example, the Y-side voltage setting unit 45 includes a minimum value selector 46, a predetermined value selector 47, and a calculator 48. The minimum value selector 46 selects a minimum voltage value (e.g., 2.58 V) allowing the touch panel to operate or a product of the minimum voltage value and the given rate including the margin just like the X side. The predetermined value selector 47 selects a predetermined value, e.g., 3.3 V. The calculator 48 performs a calculation according to methods described below to set the Y-side applied voltage.

When the applied voltage is not maintained at a predetermined level because of a voltage drop of a battery while the touch panel attached to a device is operating at the current flow time or the applied voltage set according to various methods, particularly, when the applied voltage is set to the minimum value, an applied voltage controlling section 51 in FIG. 1 raises the set applied voltage to stabilize the operation of the touch panel. The applied voltage controlling section 51 includes an applied voltage detecting unit 52.

A voltage setting changing unit 53 executes processing for changing the set voltage value. More specifically, if the applied voltage detecting unit 52 detects a risk of unstable operation caused by the applied voltage lower than the set value, the voltage setting changing unit 53 raises the set voltage of 2.58 V by 0.5V, for example. If the applied voltage detecting unit 52 detects a state where the applied voltage reaches the originally set voltage and the newly set voltage becomes too high during the foregoing processing for gradually raising the set voltage, the voltage setting changing unit 53 gradually lowers the set voltage.

Figure 2:
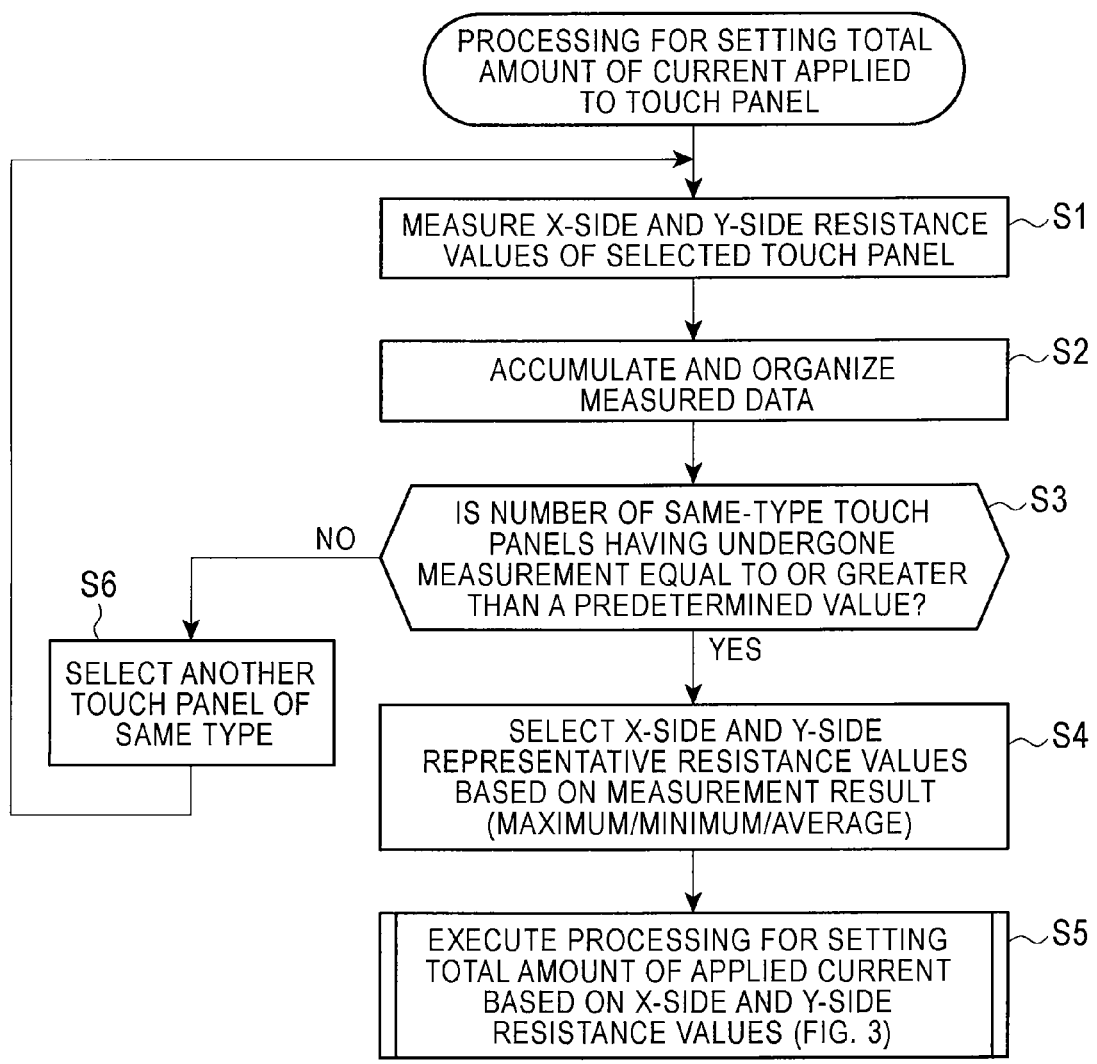
FIG. 2 is a flowchart according to an embodiment of the present invention.

The above-described functional blocks can carry out operations illustrated in flowcharts in FIG. 2 and the following drawings, for example, in accordance with various embodiments of the present invention. Embodiments of the present invention are based on a following basic concept. Since a shape of touch panels is rarely a square but often a rectangle, an X-side resistive film has a resistance value different from that of a Y-side resistance film. When a uniform power distribution control is executed on the X-side and Y-side resistive films as in the case of the related art, the resistive film having a smaller resistance value consumes more current than the resistive film having a larger resistance value. Accordingly, in the embodiments of the present invention, current flow time of the resistive film having the smaller resistance value is shortened or voltage applied thereto is reduced. Various embodiments for carrying out the basic concept are described below.

FIG. 2 illustrates an example of processing for accumulating data representing variation of resistance values, such as data illustrated in FIGS. 15A and 15B, to set different current flow time values or applied voltage values in accordance with X-side and Y-side resistance values based on the basic concept and setting a total amount of current applied thereafter.

More specifically, in the processing for setting the total amount of current applied to the touch panel illustrated in FIG. 2, resistance values of an X-side resistive film and a Y-side resistive film of a selected touch panel are measured (STEP S1). The measurement can be performed on the touch panel alone or the touch panel adhered on a surface of an LCD using terminals included in lead circuits of electrodes of the touch panel connected to a controller. Data resulting from the measurement is then accumulated and organized for later use (STEP S2).

Whether the number of touch panels of the same type having undergone the measurement is equal to or greater than a predetermined value is then determined (STEP S3). If it is determined that the number of touch panels having undergone the measurement is less than the predetermined value, e.g., 30 (NO in STEP S3), another touch panel of the same type is selected (STEP S6). The process then returns to STEP S1 and the measurement is performed on the newly selected touch panel. If it is determined that the number of touch panels having undergone the measurement is equal to or greater than the predetermined value, e.g., 30 (YES in STEP S3), preferable data is selected based on, for example, data illustrated in FIG. 15A or the accumulated data organized using a data distribution function (STEP S4). For example, one of a maximum value, a minimum value, and an average value is selected as a resistance value of each of the X side and the Y side. A description will be given below for an example in which the maximum value of 607Ω and the minimum value of 275Ω are selected for the X side and the Y side, respectively, so that a total amount of applied current can be easily compared with the result according to the related art illustrated in FIG. 10.

The foregoing processing steps can be executed by the functional blocks illustrated in FIG. 1. More specifically, the resistance value measuring unit 12 of the resistance data acquiring section 11 measures the X-side and Y-side resistance values of the selected touch panel in STEP S1. The data accumulating unit 13 sequentially organizes and accumulates the data in STEP S2. In STEP S4, the X-side resistance setting unit 15 and the Y-side resistance setting unit 16 of the resistance value setting section 14 illustrated in FIG. 1 select the maximum value 18 and the minimum value 17 from various pieces of data, such as the minimum value 17, the maximum value 18, and the average value 19, respectively.

In the example in FIG. 2, processing for setting a total amount of current based on the X-side and Y-side resistance values, such as that illustrated in FIG. 3, is then executed (STEP S5). More specifically, processing for setting the total amount of current based on the X-side and Y-side resistance values illustrated in FIG. 3 according to a first embodiment describes details of the processing executed in STEP S5 in FIG. 2. A resistance ratio (r) of the Y-side resistance value to the X-side resistance value is calculated based on the data of the actually measured resistance values acquired in the foregoing manner, such as data illustrated in FIG. 15A (STEP S11). When the X-side and Y-side resistance values are set equal to 607Ω and 275Ω, respectively, in the foregoing manner, the resistance ratio "r" represented as "r=Rx/Ry" is equal to 607 Ω/275 Ω=2.2073.

Current flow time (TL) of electrodes for the smaller resistance value is set to minimum current flow time (STEP S12). Various values can be selected as the current flow time of the electrodes for the smaller resistance values. However, the current flow time is set to the minimum value to decrease current consumption as much as possible because this invention relates to an electric power saving technology for touch panels and more current flows through a resistive film having a smaller resistance value than a resistive film having a larger resistance value. As illustrated in FIGS. 11A-11D, the minimum current flow time is set to 10 ms to obtain two matching values from detection of coordinates of a touched position performed every 2.5-3 ms although the first 3 ms of a touch operation on a touch panel, i.e., a chattering period where the operation is unstable, is inappropriate to obtain accurate resistance values.

When the resistance measurement interval is long and short, such as 5 ms and 1 ms, the minimum current flow time can be changed to 20 ms and 5 ms, respectively. The minimum value selector 38 of the Y-side time setting unit 37 of the current flow time setting section 31 illustrated in the functional block diagram of FIG. 1 selects and sets the minimum value as the current flow time of the electrodes for the smaller resistance value.

In the example illustrated in FIG. 3, current flow time (TH) of electrode for the larger resistance value is then determined based on the resistance ratio (STEP S13). In the example, the current flow time (TH) is calculated as (TL)×r=10×2.2073=22.073. For ease of control, the current flow time (TH) is set to 22 ms. The calculator 35 of the X-side time setting unit 32 of the current flow time setting section 31 illustrated in FIG. 1 executes this processing step.

Voltage (Vc) commonly applied to the X-side and Y-side resistive films is then set (STEP S14). In the embodiment of the present invention, the commonly applied voltage (Vc) is set equal to 3.3 V just like the related art to emphasize a difference between the invention and the related art, i.e., a change caused by use of the resistance ratio. The predetermined value selector 44 of the X-side voltage setting unit 42 and the predetermined value selector 47 of the Y-side voltage setting unit 45 of the applied voltage setting section 41 illustrated in FIG. 1 select 3.3 V, whereby the processing step is carried out.

Pulses illustrated at a bottom part of FIG. 3 are obtained from the above-described setting. A total amount of current is estimated regarding the example. An amount of X-side current is equal to 0.0054366 mA/ms as in the case of the related art. Since a pulse of 22 ms is applied to the X side and a pulse of 10 ms is applied to the Y side, a sum of the X-side current flow time and the Y-side current flow time is equal to 32 ms. When data is acquired in units of 100 ms, the operation for switching between application of voltage to the X side and to the Y side is performed (100/32) times. Accordingly, an amount of current consumed by the X side during 100 ms is equal to 0.3738 mA/100 ms as illustrated in FIG. 3. A current Iy consumed by the Y side per millisecond is equal to 0.01200 mA/ms as in the case of the related art illustrated in FIG. 10. However, an amount of current consumed by the Y side during 100 ms is equal to 0.3750 mA/100 ms as illustrated in FIG. 3. Accordingly, as illustrated in FIG. 3, a sum of the amounts of current consumed by the X and Y sides is equal to 0.7488 mA/100 ms. Thus, the total amount of current according to the embodiment is 85.9% of the result according to the related art illustrated in FIG. 10.

As described above, the embodiment of the present invention can decrease electric power consumed by the touch panel by differently setting current flow time of each resistive film based on the resistance ratio in accordance with facts that X-side and Y-side resistive films of the touch panel have different resistance values and electric power is alternatively supplied to the resistive films.

As described above, the resistance ratio of the Y-side resistance value to the X-side resistance value is focused on in the example illustrated in FIG. 3. Determining such a resistance ratio by measuring actual resistance values of touch panels requires lots of efforts. Since it is estimated that the X-side and Y-side resistance values differ in accordance with X-direction and Y-direction lengths of a resistive film, it can be considered that the resistance ratio of the X-side and Y-side resistance values is related to an aspect ratio. Accordingly, FIG. 4 illustrates an example for setting a total amount of current utilizing this fact.

More specifically, in processing for setting a total amount of current based on X-side and Y-side resistance values according to a second embodiment illustrated in FIG. 4, a resistance ratio of the X-side and Y-side resistance values is estimated based on an aspect ratio (STEP S21). An aspect ratio of 16:9 is used since the first embodiment uses the example resistance data acquired from monitors having the aspect ratio of 16:9. As illustrated in FIG. 4, the estimated resistance ratio is equal to 1.778, which is differs from 2.2073 obtained when the maximum and minimum resistance values are selected for the X side and the Y side, respectively. However, the estimated resistance ratio is closer to the resistance ratio determined in the first embodiment than a resistance ratio (470/331=1.42) obtained when average values are selected for the X side and the Y side, for example.

In the example illustrated in FIG. 4, an operation similar to that illustrated in FIG. 3 is then executed to set current flow time of electrodes for a smaller resistance value to a minimum value (STEP S22). In the illustrated example, 10 ms is selected. Current flow time of electrodes for a larger resistance value is then determined based on the aspect ratio (STEP S23). In the illustrated example, a value of 10 ms×1.778=17.78 ms is obtained. However, to simplify the value actually used in the control operation, the current flow time is set to 18 ms.

Voltage (Vc) commonly applied to X-side and Y-side resistive films is then set (STEP S24). In the illustrated example, the commonly applied voltage is set to 3.3 V to make comparison between this embodiment and the related art easier. As a result, pulses illustrated at a bottom part of FIG. 4 and an estimation example of a total amount of current illustrated therein are obtained. As a result of a decrease in the X-side current flow time to 18 ms from 22 ms of FIG. 3, a ratio of the current flow time of the electrodes for the larger resistance values becomes smaller than that of the example illustrated in FIG. 3 and the total amount of current increases by that amount. Even so, the second embodiment can decrease electric power consumption of the related art illustrated in FIG. 10 by more than 10%.

FIG. 5 illustrates an operation flow of processing for setting a total amount of applied current based on X-side and Y-side resistance values according to a third embodiment. In the embodiments illustrated in FIGS. 3 and 4, the power consumption is decreased by setting the values of the current flow time based on the ratio of the resistance values and the alternative value thereof, respectively. FIG. 5 illustrates a method for decreasing power consumption as much as possible based on a difference between the X-side and Y-side resistance values but not based on the data of the resistance values. The method illustrated in FIG. 5 is characterized in that current flow time of electrodes for a larger resistance value is set as long as possible and current flow time of electrodes for a smaller resistance value is set as short as possible to decrease an amount of applied current. A period of an operation for switching between power distribution to the X-side electrodes and that to the Y-side electrodes is set to 40 ms so that a high-speed operation of a touch panel can be handled.

In accordance with the conditions, the current flow time of the electrodes for the smaller resistance value is set to a minimum value, i.e., 10 ms, in the example illustrated in FIG. 5 (STEP S31). The current flow time of the electrodes for the larger resistance value is then set to 40–10 ms=30 ms (STEP S32). Voltage (Vc) commonly applied to X-side and Y-side resistive films is then set (STEP S33). In the illustrated example, the commonly applied voltage is set to 3.3 V just like the foregoing embodiments for ease of comparison with the related art.

Such a setting operation yields pulses illustrated at a bottom part of FIG. 5. As illustrated in FIG. 5, an estimated total amount of current is equal to 0.7077 mA/100 ms, which is approximately 81.2% of the result according to the related art illustrated in FIG. 10. Thus, power consumption can be decreased by approximately 20%.

Although FIG. 6 omits illustration of an operation flow, FIG. 6 illustrates an example of decreasing power consumption by setting applied voltage close to minimum operable voltage in addition to the above-described conditions. Shapes of illustrated pulses are similar to those of the example illustrated in FIG. 5. This example differs from that of FIG. 5 in that applied voltage is set to 2.58 V that is closer to a minimum voltage limit for allowing a touch panel of this type to correctly operate though the applied voltage is set equal to 3.3 V in FIG. 5. An estimation example of a total amount of current is as illustrated in FIG. 6. More specifically, the total amount of current is equal to 0.5533 mA/100 ms, which is 63.35% of the result according to the related art illustrated in FIG. 10. Accordingly, the power consumption can be greatly decreased.

The minimum voltage limit for allowing the touch panel to correctly operate is set equal to 2.58 V in the example illustrated in FIG. 6 because of the following reason. When general touch panels are driven at 3.3 V and 10 bits (1024) are used by one dot, a voltage of 3.2 mV is used by one dot. Since wide video graphics array (WVGA) currently widely used includes 800 dots in the horizontal direction, a voltage of 3.2 mV×800 dots=2.58 V is used. Accordingly, the WVGA displays having 800 horizontal dots correctly operate at the applied voltage of 2.58V.

Figure 9:
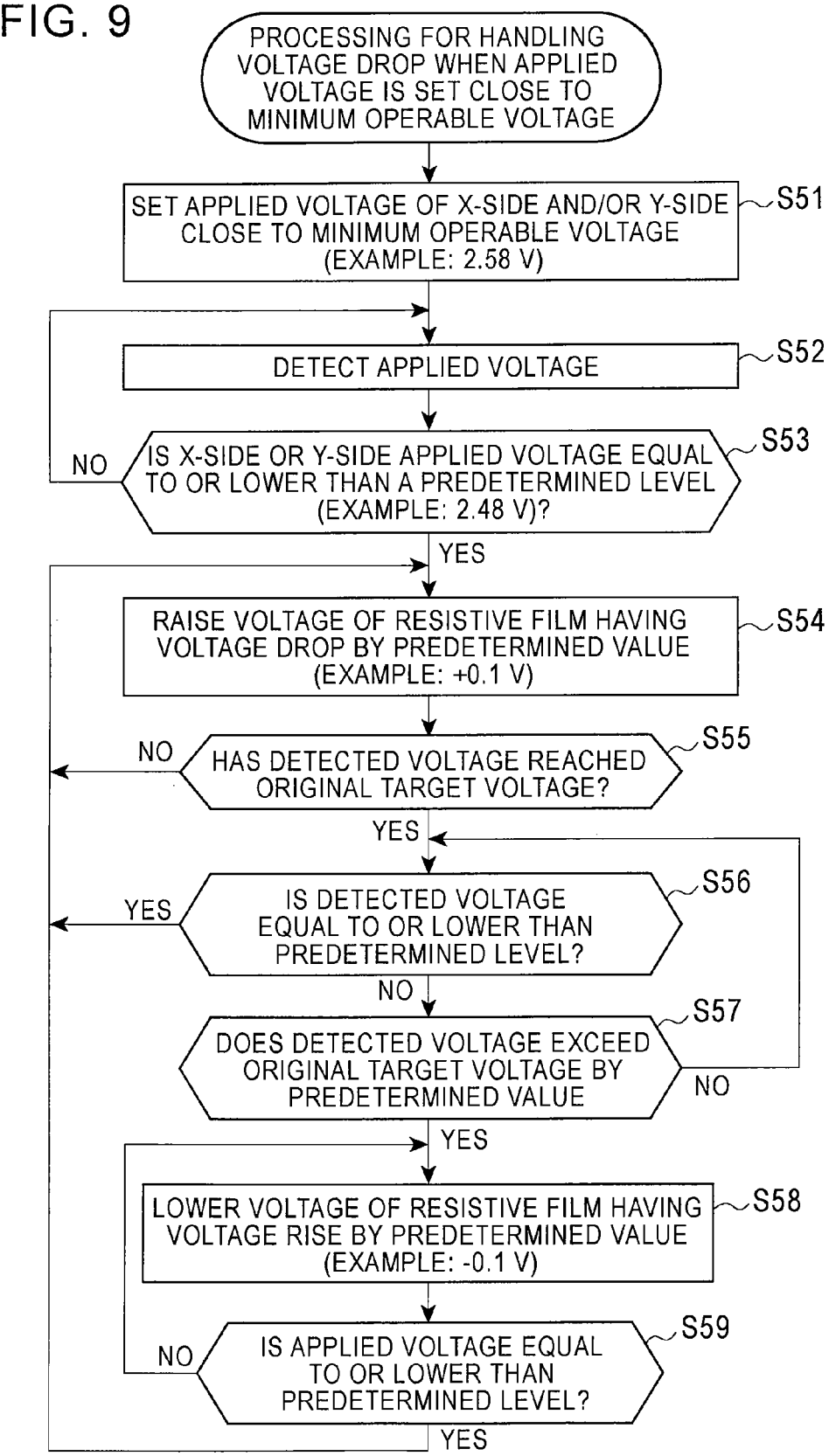
FIG. 9 is a flowchart of an operation for handling a voltage drop according to an embodiment of the present invention.

However, since a drop of the applied voltage makes the operation of the touch panel unstable, the applied voltage is to be monitored. When a state is detected where maintenance of the target voltage becomes difficult, for example, because of a drop of battery voltage, the target voltage is temporarily raised by 0.1 V. If the voltage rise is not enough, the target voltage is further raised by 0.1 V. If the original target voltage level is maintained after such an operation, the state is kept. Conversely, if a continuous voltage rise occurs, the target voltage is lowered by 0.1 V, for example, to ultimately allow the touch panel to operate at 2.58 V again. Such a control operation can guarantee the operation of the touch panel. Since this control operation is adopted in a method for saving electric power of a touch panel by controlling applied voltage, described later, a flow of the control operation is illustrated in FIG. 9.

FIG. 7 illustrates processing for setting a total amount of current based on X-side and Y-side resistance values according to a fifth embodiment. Although the total amount of current is adjusted by setting the values of the current flow time in the foregoing embodiments, it is adjusted by setting of applied voltage in this embodiment. More specifically, in the processing for setting the total amount of current based on the X-side and Y-side resistance values illustrated in FIG. 7, voltage applied to electrodes for a larger resistance value is set (STEP S41). In the illustrated example, the voltage is set to 3.3 V for the X-side electrodes just like the related art.

A current Ix applied to the electrodes for the larger resistance value is then calculated (STEP S42). In this example, the current Ix is equal to 3.3/607=0.0054366 mA/ms. A current Iy applied to electrodes for a smaller resistance value is calculated thereafter (STEP S43). In the illustrated example, the current Iy is equal to 0.003636×Vy, which is in proportion to Vy. A target total amount of current is then set in the example illustrated in FIG. 7 (STEP 44). This operation is performed to indicate that the method according to this embodiment can offer an electric power saving effect similar to that provided by, for example, the methods according to the embodiment illustrated in FIG. 3 and the other embodiments. Since the total amount of current is equal to 0.7488 mA/100 ms in the embodiment illustrated in FIG. 3, the target amount of current is set equal to this value in this example.

Thereafter, X-side and Y-side voltage application intervals are then set to a predetermined value (STEP S45). For ease of comparison with the related art illustrated in FIG. 10 and correspondence to the example of FIG. 3, the intervals are set to 10 ms in this example. Voltage applied to a resistive film having the smaller resistance value is then calculated using an equation in which a sum of X-side and Y-side amounts of current is equal to the target total amount of current. The equation is represented as illustrated in FIG. 7, i.e., [(Ix)×10+ 0.003636×(Vy)×10]×5 times=0.7488. As illustrated in FIG. 7, this equation yields the voltage value Vy=2.6236 V. That is, electric power saving similar to that resulting from adjustment of current flow time based on the resistance values illustrated in FIG. 3 is advantageously obtained by applying voltages of 3.3 V and 2.624 V to the X-side resistive film having the larger resistance value and the Y-side resistive film having the smaller resistance value, respectively. Additionally, FIG. 7 illustrates an estimation example of a total amount of current using a method similar to the above-described ones. In the estimation example, the target total amount of current, i.e., 0.7488 mA/100 ms, is obtained.

FIG. 8 illustrates an example for further promoting electric power saving by the setting regarding applied voltage according to the difference between the X-side and Y-side resistance values illustrated in FIG. 7. More specifically, although FIG. 8 omits a flowchart, voltage commonly applied to X and Y sides is set to a minimum operable voltage in processing for setting a total amount of current based on X-side and Y-side resistance values illustrated in FIG. 8. More specifically, the commonly applied voltage is set to 2.58 V in this example just like the example of FIG. 6.

Current flow time of a resistive film having a smaller resistance value is then set as short as possible (e.g., 10 ms). In this example, current flow time of the other resistive film is also set to 10 ms. Since FIG. 6 illustrates the example of setting the commonly applied voltage to the minimum target value of 2.58 V as in the case of this embodiment but setting different values for current flow time in accordance with a difference between the resistance values, the values of the current flow time are set equal in the example illustrated in FIG. 8.

When electric power distribution illustrated in FIG. 8 is performed under such conditions, a sum of amounts of current becomes equal to 0.6816 mA/100 ms as illustrated in an estimation example of a total amount of current. The resulting value is 78.08% of the result according to the related art illustrated in FIG. 10 and, thus, power consumption is decreased. The X-side and Y-side current flow time values are set equal in this embodiment. When a method is adopted in which current flow time of the resistive film having the larger resistance value is set as long as possible by incorporating current flow time control based on the resistance values to promote further electric power saving, the method can promote further electric power saving as in the case of the method illustrated in FIG. 7.

When applied voltage is lowered to decrease power consumption as illustrated in FIGS. 6 and 8, a temporarily drop of the applied voltage may make an operation of a touch panel unstable. FIG. 9 illustrates measures for preventing the unstable operation. More specifically, in an example of processing for handling a voltage drop when applied voltage is set close to minimum operable voltage illustrated in FIG. 9, voltage applied to the X side and/or the Y side is set close to the minimum operable voltage (e.g., 2.58 V) (STEP S51). Actual voltage values of the X side and Y side are then detected (STEP S52). Whether one of the detected voltage values is equal to or lower than a predetermined level is determined (STEP S53). If the both of the applied voltage values are higher than the predetermined level, e.g., 2.48 V (NO in STEP S53), the process returns to STEP S52 and the above-described steps are repeated.

If it is determined that one of the applied voltage values is equal to or lower than the predetermined level in STEP S53, the target voltage of the resistive film having the voltage drop is raised by a predetermined value (STEP S54). Any value can be set as the predetermined value. For example, the target voltage is set to 2.68 V by raising the original target voltage by 0.1 V. In accordance with the newly set target voltage, an applied voltage controlling circuit performs a control operation so that the actual voltage becomes equal to the target level.

Thereafter, whether the detected voltage has reached the original target voltage, i.e., 2.58 V, is determined (STEP S55). If it is determined that the detected voltage has not reached the original target voltage (NO in STEP S55), the process returns to STEP S54 and the target voltage of the resistive film having the voltage drop is further raised by the predetermined value, e.g., 0.1 V. As a result, the target voltage becomes equal to 2.78V. Thereafter, the processing for raising the target voltage is continued until it is determined that the detected voltage has reached the original target voltage in STEP S55.

If it is determined that the detected voltage has reached the original target voltage (YES in STEP S55), the process proceeds to STEP S56. The above-described operation is not generally performed since the detected voltage becomes equal to the target applied voltage of 2.58 V. However, voltage equal to the original target voltage may be unavailable because of a battery voltage drop and, for example, only 2.40 V may be applied. In such a case, if the target voltage is raised to 2.78 V by the foregoing operation and voltage control for applying the voltage of 2.78 V is performed, the detected voltage may become equal to 2.59 V. Accordingly, it can be determined that the detected voltage has reached the original target voltage.

Whether the detected voltage is equal to or lower than the predetermined level is then determined (STEP S56). If it is determined that the detected voltage is equal to or lower than the predetermined level again (YES in STEP S56), the process returns to STEP S54 and the foregoing steps are repeated. If it is determined that the detected voltage is higher than the predetermined level (NO in STEP S56), whether the detected voltage exceeds the original target voltage, i.e., 2.58 V, by a predetermined value is determined (STEP S57).

If it is determined that the detected voltage does not exceed the original voltage by the predetermined value (NO in STEP S57), the process returns to STEP S56 and the foregoing steps are repeated. More specifically, for example, when the target voltage is set equal to 2.78 V in the operation and the voltage detected in STEP S56 is equal to, for example, 2.59 V, the detected voltage is determined to be larger than the predetermined level, such as 2.48 V, in STEP S56. In STEP S57, the detected voltage is determined not to exceed the original target value of 2.58 V by 0.1 V, i.e., 2.68 V. In such a case, it is determined that the control operation is stable.

If it is determined that the detected voltage exceeds the original target voltage of 2.58 V by the predetermined value, e.g., 0.1 V, in STEP S57, the target voltage gradually raised in the foregoing manner is lowered by a predetermined value, e.g., 0.1 V (STEP S58). In this way, the target voltage raised up to 2.78 V is lowered to 2.68 V. Thereafter, whether the applied voltage is equal to or lower than the predetermined level is determined (STEP S59). For example, if the applied voltage is determined to be larger than the predetermined level, e.g., 2.68 V (NO in STEP S59), the process returns to STEP S58 and the operation for lowering the target voltage by the predetermined value, such as 0.1 V, is repeated.

If it is determined that the applied voltage is equal to or lower than the predetermined level in STEP S59, the process returns to STEP S54 and the operation for raising the target voltage applied to the resistive film having the voltage drop by the predetermined value is executed as in the case where it is determined that the one of the applied voltage values is equal to or lower than the predetermined level in STEP S53. Thereafter, the similar operation is repeated. The foregoing processing prevents the operation of the touch panel from becoming unstable owing to a slight alteration of the applied voltage when power consumption is reduced by setting low voltage applied to electrodes for the smaller resistance value and allows the embodiments of the present invention to function.

Although preferred embodiments have been described in detail, the present invention is not limited to these specific embodiments of the present invention. Rather, various modifications and changes can be made without departing from the scope of the present invention as described in the accompanying claims. Accordingly, all such modifications are intended to be included within the scope of this invention as defined in the following claims.

What is claimed is:

1. A method for driving a touch panel, the touch panel including an X-side resistive film and a Y-side resistive film, the films facing each other with a predetermined gap therebetween, the method comprising:
    obtaining a saved representative resistance value corresponding to the X-side resistive film and the Y-side resistive film;
    calculating an X-side on-period corresponding to a connection to the X-side resistive film to establish an amount of current flow to the X-side resistive film during the X-side on-period, based on the corresponding saved representative resistance value;
    calculating a Y-side on-period corresponding to a connection to the Y-side resistive film to establish an amount of current flow to the Y-side resistive film during the Y-side on-period, based on the corresponding saved representative resistance value;
    alternately switching between a connection to the X-side resistive film and a connection to the Y-side resistive film using a switch, to detect X and Y coordinates of a contact position of the X-side resistive film and the Y-side resistive film, the alternate switching occurring based on the X-side on-period and the Y-side on-period, respectively, wherein the on-periods are calculated so as to minimize a sum of the X-side current flow and Y-side current flow, and wherein the X-side on-period is different than the Y-side on-period;
    wherein the saved representative resistance values were previously saved based on measured resistance values of X-side resistive films and measured resistance values of Y-side resistive films, for a plurality of touch panels, the plurality of measured resistance values being averaged and saved as the corresponding representative resistance values, respectively;
    wherein the amount of the X-side current flow and the amount of the Y-side current flow are set to be different from each another by setting different values for the X-side on-period and the Y-side on-period, respectively; and
    wherein the current flow time of a first side corresponding to the smaller resistance value is set to a smaller current flow time than the current flow time of a second side having the larger resistance value.

2. The method according to claim 1, wherein the representative resistance values include the resistance value of the resistive film and a resistance value of a lead circuit connected to the resistive film.

3. The method according to claim 1, wherein the representative resistance values are based on accumulated data of resistance values resulting from measurement on a plurality of touch panels.

4. The method according to claim 1, wherein the representative resistance values vary in accordance with an aspect ratio of the touch panel.

5. The method according to claim 1, wherein the on-period of the first side is set to a minimum value that permits successful the detection of the coordinates of the contact position.

6. The method according to claim 1, wherein the on period of the second side is set to a maximum value that does not disturb the detection of the coordinates of the contact position.

7. The method according to claim 1, wherein an amount of an X-side applied current and an amount of a Y-side applied current are set to be different from each another by setting different values for voltage applied to the X-side resistive film and voltage applied to the Y-side resistive film, respectively, and wherein
    the voltage applied to a first side corresponding to the smaller resistance value is set to a smaller voltage than the voltage applied to a second side having the larger resistance value.

8. The method according to claim 7, wherein the applied voltage is set to target voltage close to a minimum value that permits successful detection of the coordinates of the contact position; and wherein
    the applied voltage is controlled so that a detected voltage value substantially approximates the set target voltage.

9. The method according to claim 1, wherein an amount of an X-side applied current and an amount of a Y-side applied current are set to be different from each another by setting different values for an X-side current flow time and a Y-side current flow time, respectively, and by setting different values for voltage applied to the X-side resistive film and voltage applied to the Y-side resistive film, respectively.

10. The method according to claim 1, wherein
    an amount of an X-side applied current and an amount of a Y-side applied current are set to be different from each another by setting a current flow time corresponding to a first side having a smaller resistance value to a value shorter than a current flow time of a second side having the larger resistance value;
    the current flow time of the first side is set to a minimum value that permits successful the detection of the coordinates of the contact position; and wherein
    the current flow time of the second side is set to a maximum value that does not disturb the detection of the coordinates of the contact position.

11. An apparatus for driving a touch panel, the touch panel including an X-side resistive film and a Y-side resistive film, the films facing each other with a predetermined gap therebetween, a detecting unit configured to detect a contact position of the X-side resistive film and the Y-side resistive film, the apparatus comprising:
    a time setting unit configured to determine an X-side on-period corresponding to a connection to the X-side resistive film to establish an amount of current flow to the X-side resistive film during the X-side on-period, based on a corresponding representative resistance value previously saved, and configured to determine a Y-side on-period corresponding to a connection to the Y-side resistive film to establish an amount of current flow to the Y-side resistive film during the Y-side on-period, based on a corresponding representative resistance value previously saved;
    a setting unit configured to alternately switch between a connection to the X-side resistive film and a connection to the Y-side resistive film, to detect X and Y coordinates of a contact position of the X-side resistive film and the Y-side resistive film, the alternate switching occurring based on the X-side on-period and the Y-side on-period, respectively, wherein the on-periods are calculated so as to minimize a sum of the X-side current flow and Y-side current flow, and wherein the X-side on-period is different than the Y-side on-period;

wherein the representative resistance values were previously saved based on measured resistance values of X-side resistive films and based on measured resistance values of Y-side resistive films, for a plurality of touch panels, the plurality of measured resistance values being averaged and saved as the corresponding representative resistance values, respectively;

wherein the setting unit sets an amount of X-side applied current and sets an amount of Y-side applied current to be different from each another by setting different values for an X-side current flow time and an Y-side current flow time, respectively; and wherein the current flow time of a first side corresponding to the smaller resistance value is set to a smaller current flow time than the current flow time of a second side having the larger resistance value.

12. The apparatus according to claim 11, wherein the representative resistance values include a resistance value of the resistive film and a resistance value of a lead circuit connected to the resistive film.

13. The apparatus according to claim 11, wherein the representative resistance values are based on accumulated data of resistance values resulting from measurement on a plurality of touch panels.

14. The apparatus according to claim 11, wherein the representative resistance values vary in accordance with an aspect ratio of the touch panel.

15. The apparatus according to claim 11, wherein the current flow time of the first side is set to a minimum value that permits successful detection of the coordinates of the contact position.

16. The apparatus according to claim 11, wherein the current flow time of the second side is set to a maximum value that does not disturb the detection of the coordinates of the contact position.

17. The apparatus according to claim 11, wherein
the setting unit sets the X-side on-period and the Y-side on-period to be different from each another by setting different values for voltage applied to the X-side resistive film and voltage applied to the Y-side resistive film, respectively; and wherein
the voltage applied to a first side corresponding to the smaller resistance value is set to a smaller voltage than the voltage applied to the second side having the larger resistance value.

18. The apparatus according to claim 17, wherein the applied voltage is set to a target voltage close to a minimum value that allows the detection of the coordinates of the contact position to be successfully performed, and wherein
the applied voltage is controlled so that a detected voltage value substantially approximates the set target voltage.

19. The apparatus according to claim 11, wherein the setting unit sets different values for the X-side on period and the Y-side on-period, respectively, and sets different values for voltage applied to the X-side resistive film and voltage applied to the Y-side resistive film, respectively.

20. The apparatus for driving a touch panel according to claim 11, wherein the setting unit sets a current flow time of one side having the resistance value smaller than the other side shorter than a current flow time of the other side having the larger resistance value, sets the current flow time of the side having the smaller resistance value to a minimum value that allows the detection of the coordinates of the contact position to be successfully performed, and sets the current flow time of the other side having the larger resistance value to a maximum value that does not disturb the detection of the coordinates of the contact position.

* * * * *